United States Patent
Kopp et al.

[11] Patent Number: 5,183,876
[45] Date of Patent: Feb. 2, 1993

[54] UREA GROUP-CONTAINING POLYISOCYANATES MODIFIED WITH LONG CHAIN COMPOUNDS AND A PROCESS FOR THEIR PREPARATION

[75] Inventors: Richard Kopp, Cologne; Gerhard Grögler, Leverkusen; Heinrich Hess, Cologne, all of Fed. Rep. of Germany

[73] Assignee: Bayer Aktiengesellschaft, Leverkusen, Fed. Rep. of Germany

[21] Appl. No.: 651,693

[22] Filed: Feb. 6, 1991

Related U.S. Application Data

[63] Continuation-in-part of Ser. No. 383,948, Jul. 21, 1989, abandoned.

[30] Foreign Application Priority Data

Aug. 4, 1988 [DE] Fed. Rep. of Germany ....... 3826447

[51] Int. Cl.⁵ ............................................. C08G 18/10
[52] U.S. Cl. ...................... 528/59; 528/61; 528/64; 528/66
[58] Field of Search .................. 528/59, 61, 64, 66

[56] References Cited

U.S. PATENT DOCUMENTS

| | | | |
|---|---|---|---|
| 4,276,386 | 6/1981 | Schwindt et al. | 521/160 |
| 4,321,173 | 3/1982 | Schuhmacher et al. | 525/453 |
| 4,605,756 | 8/1986 | Grögler et al. | 560/351 |
| 4,677,136 | 6/1987 | Rasshofer et al. | 521/159 |

Primary Examiner—Maurice J. Welsh
Attorney, Agent, or Firm—Joseph C. Gil; Thomas W. Roy

[57] ABSTRACT

The present invention is directed to novel urea group-containing polyisocyanates modified with long chain compounds having molecular weights of 400 to about 10,000. The present invention is also directed to a process for the preparation of modified urea group-containing polyisocyanates by reacting starting polyisocyanates which are free from urea groups with water to form urea groups in an inert reaction medium or in an aqueous mixture containing a dispersion stabilizer, wherein the starting polyisocyanates are mixed or reacted with long chain compounds having molecular weights of 400 to about 10,000 before the reacting the starting polyisocyanates with water and/or the long chain compounds are added to the inert reaction medium and/or to the water.

13 Claims, No Drawings

UREA GROUP-CONTAINING POLYISOCYANATES MODIFIED WITH LONG CHAIN COMPOUNDS AND A PROCESS FOR THEIR PREPARATION

CROSS REFERENCE TO RELATED APPLICATIONS

This application is a continuation-in-part of copending application, Ser. No. 07/383,948, filed Jul. 21, 1989 and now abandoned.

BACKGROUND OF THE INVENTION

1. Field of the Invention

The present invention is directed to novel urea group-containing polyisocyanates which are modified with long chain compounds having a molecular weight of 400 to about 10,000 and a process for the preparation of these modified polyisocyanates.

2. Description of the Prior Art

Polyisocyanates containing urea groups are known. The diisocyanate prepared from 2 moles of 2,4-toluylene diisocyanate and 1 mole of water has been used in various polyurethane systems (see U.S. Pat. Nos. 4,035,467, 2,818,404, DE 3,230,757 and DE 3,403,498). Also, the urea diisocyanate obtained from 2 moles of 2,6-toluylene diisocyanate and 1 mole of water is known (see U.S. Pat. No. 2,902,474).

These compounds, which are generally in the form of relatively high melting solids, are preferably prepared by reacting the starting polyisocyanates, which are free from urea groups, with water. Various methods are known for conducting this reaction as disclosed in U.S. Pat. Nos. 2,757,184, 3,906,019, DE 3,438,527 and DE 3,638,148).

The urea group-containing polyisocyanates prepared by these processes have in recent times been of great interest as solid isocyanate components for heterogeneous one component systems based on solid polyisocyanates and liquid or solid isocyanate reactive compounds. At low temperatures, the polyisocyanates and isocyanate reactive compounds are present side by side as separate phases in these systems and react very slowly with one another. It is only at relatively high temperatures that these systems become sufficiently compatible with one another to undergo a complete reaction. It is also possible to obtain complete stability in storage of these systems by surface inactivation of the polyisocyanate as disclosed in DE 3,230,757 (EP 103,323) and DE 3,403,500 (EP 150,790).

When polyisocyanates containing urea groups, in particular the produces prepared by the so called "water process" (DE 3,230,757 and DE 3,636,148) are used as the isocyanate component in heterogeneous one component systems which contain relatively low molecular weight isocyanate reactive components, it has been found that the cured end products do not attain the level of properties found in products which have been prepared from the same starting components but by different processes (e.g., by casting a solution obtained by a reaction of the starting components in an appropriate solvent).

This means that the reaction of the components of the heterogeneous system does not proceed quantitatively to form a homogeneous end product. Rather, a portion of the components remains unreacted.

It has now surprisingly been found that this problem may be solved by modifying the urea group containing polyisocyanates with long chain compounds.

SUMMARY OF THE INVENTION

The present invention is directed to novel urea group-containing polyisocyanates modified with long chain compounds having molecular weights of 400 to about 10,000.

The present invention is also directed to a process for the preparation of modified urea group-containing polyisocyanates by reacting starting polyisocyanates which are free from urea groups with water to form urea groups in an inert reaction medium or in an aqueous mixture containing a dispersion stabilizer, wherein the starting polyisocyanates are mixed or reacted with long chain compounds having molecular weights of 400 to about 10,000 before reacting the starting polyisocyanates with water and/or the long chain compounds are added to the inert reaction medium and/or to the water.

DETAILED DESCRIPTION OF THE INVENTION

The new products are preferably prepared by reacting the starting polyisocyanate with water. This reaction may be carried out in an inert solvent as disclosed in U.S. Pat. No. 2,757,184 or in emulsion in an excess of water as disclosed in DE 3,438,527 and DE 3,636,148) as reaction medium.

In accordance with the present invention the polyisocyanate starting material may be mixed with the required quantity of modifying compound before the reaction with water. If the modifying component is isocyanate reactive, e.g., if it is a polyether, polyester or macromolecular polyamine, it is preferably reacted with the starting polyisocyanate before the water reaction. After this initial reaction, modified polyisocyanates containing urethane, urea and/or amide groups are obtained, which may be converted into allophanate, biuret or similar groups by known methods, e.g., by conducting the initial reaction at a higher temperature.

The process may be carried out with a) a solution of the modifying agent in the basic polyisocyanate or b) the reaction product, prepared by known methods, of the modifying compound and starting polyisocyanate. The reaction product may optionally contain only small quantities of unreacted starting polyisocyanate if the reaction product is treated, e.g., in a thin layered evaporator. Reaction products containing unreacted starting polyisocyanate may also be used.

Further, the modifying compound may be partly or completely dissolved or dispersed in the reaction medium (water or inert solvent) and used in this form. In this embodiment the modifying compound comes in contact with the polyisocyanate during the reaction with water, i.e., after the addition of the starting polyisocyanate to the reaction medium.

The starting polyisocyanates, which are free from urea groups, may be aliphatic, cycloaliphatic, araliphatic, aromatic or heterocyclic polyisocyanates, e.g., those described by W. Siefken in Justus Liebigs Annalen der Chemie, 562, pages 75 to 136; Examples of starting polyisocyanates are those corresponding to the formula Q(NCO)n wherein n=2 to 4, preferably 2, and Q represent an aliphatic hydrocarbon group with 2 to 18, preferably 6 to 10 carbon atoms, a cycloaliphatic hydrocarbon group with 4 to 15, preferably 5 to 10 carbon atoms, an aromatic hydrocarbon group with 6 to 15, preferably 6 to 13 carbon atoms or an araliphatic hydrocarbon group with 8 to 15, preferably 8 to 13 carbon atoms.

Examples of these polyisocyanates include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and/or -1,4-diisocyanate, 1-isocyanato-3,3,5-trimethyl-5-isocyanatomethylcyclohexane (DE Auslegeschrift 1,202,785, U.S. Pat. No. 3,401,190), 2,4- and/or 2,6-hexahydrotoluylene diisocyanate, hexahydro-1,3- and/or -1,4-phenylene diisocyanate, perhydro-2,4'- and/or 4,4'-diphenylmethane diisocyanate, 1,3- and 1,4-phenylene diisocyanate, 2,4- and/or 2,6-toluylene diisocyanate, diphenylmethane-2,4'-, 4,4'- and/or -2,2'-diisocyanate and napthylene-1,5-diisocyanate.

Further examples of suitable starting polyisocyanates include triphenylmethane-4,4',4''-triisocyanate, polyphenyl-polymethylene polyisocyanates which are obtained by the phosgenation of aniline/formaldehyde condensates as described, e.g., in GB Patent Specifications 874,430 and 848,671, perchlorinated aryl polyisocyanates as described, e.g., in E Auslegeschrift 1,157,601 (U.S. Pat. No. 3,277,138) and norbornane diisocyanates as described in U.S. Pat. No. 3,492,330.

It is particularly preferred to use commercially available polyisocyanates such as 2,4- and/or 2,6-toluylene diisocyanate ("TDI"), polyphenyl-polymethylene polyisocyanates which may be prepared by the phosgenation of aniline-formaldehyde condensates ("crude MDI") and polyisocyanates containing urethane groups, allophanate groups or isocyanurate groups ("modified polyisocyanates"), especially those modified polyisocyanates which are derived rom 2,4- and/or 2,6-toluylene diisocyanate or from 4,4'-, 2,4'- and/or 2,2'-diphenylmethane diisocyanate. 2,4-toluylene diisocyanate is most preferred.

The polyisocyanates may be used in the form of a (concentrated) solution in a solvent which is insert towards polyisocyanates and immiscible with water, preferably an aliphatic or aromatic hydrocarbon such as n-hexane, cyclohexane, isooctane, benzene, toluene or xylene.

Suitable long chain modifying components are those which have a polar character such as monovalent or polyvalent, relatively high molecular weight compounds containing from 1 to 8, preferably 2 to 4 most preferably 2 hydroxyl or amino groups and having a molecular weight of 400 to about 10,000, preferably about 800 to 6,000 and more preferably about 1,000 to 4,500.

Examples of preferred long chain compounds include a particular polyesters, polyethers, polythioethers, polyacetals, polycarbonates, polylactones and polyester amides containing at least two hydroxyl groups as well as polybutadiene compounds which are known for the preparation of cellular or non-cellular polyurethane foams. Polyethers and polyesters are particularly preferred.

Suitable polyethers are known and include those prepared, for example, by the polymerization of tetrahydrofuran or epoxides such as ethylene oxide, propylene oxide, butylene oxide, styrene oxide or epichlorohydrin or by the chemical addition of these epoxide compounds, preferably ethylene oxide or propylene oxide, either as mixtures or successively, to starting compounds containing reactive hydrogen atoms such as water, polyhydric alcohols, ammonia, polyvalent amines or sugars.

Examples of suitable hydroxyl polyesters for use as long chain compounds include the reaction products of polyhydric, preferably dihydric alcohols with the optional addition of trihydric or higher hydric alcohols, and polybasic, preferably dibasic polycarboxylic acids, their anhydrides or corresponding polycarboxylic acid esters of lower alcohols. The polycarboxylic acids may be aliphatic, cycloaliphatic, aromatic, araliphatic and/or heterocyclic and may be unsaturated or substituted, e.g., with halogen atoms.

Examples of such carboxylic acids and their derivatives include adipic acid, sebacic acid, azelaic acid, dodecane-diacid, phthalic acid, isophthalic acid, tetrahydrophthalic acid anhydride, tetrachlorophthalic acid anhydride, endomethylene tetrahydrophthalic acid anhydride, glutaric acid anhydride, maleic acid anhydride, fumaric acid, dimerized and trimerized unsaturated fatty acids, dimethyl terephthalate and bis-glycol terephthalate.

Examples of suitable polyhydric alcohols for preparing the hydroxyl polyesters include ethylene glycol, propane diol-(1,2) and -(1,3), butane diol-(1,4) and -(2,3), hexane diol-(1,6), decane diol-(1,10), neopentyl glycol, 1,4-bis-hydroxymethyl cyclohexane, 2-methyl-1,3-propane diol and glycerol. Polyesters of lactones such as ε-caprolactone or hydroxy carboxylic acids such as ω-hydroxycaproic acid may also be used, especially if they contain additional components such as diethylene glycol or 1,4-butane diol to reduce their high crystallinity.

Suitable polyacetals include the compounds which may be prepared from glycols and formaldehyde.

Suitable hydroxyl-containing polycarbonates are known and may be obtained, e.g., by the reaction of propane-1,3-diol, butane-1,4-diol, hexane-1,6-diol, di-, tri- or tetraethylene glycol and/or thiodiglycol with phosgene or diaryl carbonates such as diphenyl carbonate.

Polybutadienes containing hydroxyl end groups are also suitable for the purpose of this invention. They may be used in the form of polyhydroxyl compounds containing high molecular weight polyadducts, polycondensates or polymers in a finely dispersed or dissolved form.

Polyhydroxyl compounds of this type may be obtained by polyaddition reactions (e.g., reactions between polyisocyanates and amino functional compounds) or polycondensation reactions (e.g., between formaldehyde and phenols and/or amines) which take place in situ in the above mentioned compounds containing hydroxyl groups.

Polyhydroxyl compounds modified with vinyl polymers are also suitable for the process according to the invention, e.g., the polyhydroxyl compounds obtained by the polymerization of styrene and acrylonitrile in the presence of polyethers or polycarbonate polyols.

Further examples of the compounds which may be used are described in detail in High Polymers, Volume XVI, "Polyurethanes, Chemistry and Technology" by Saunders-Frisch, Interscience Publishers, New York, London, Volume I, 1962, pages 32 to 42 and pages 44 to 54; Volume VII, Vieweg-Höchtlen, Carl Hanser Verlag, Munich, 1966, pages 45 to 71; and in DE-A 2 854 284. Mixtures of the above mentioned polyhydroxyl compounds may, of course, also be used.

Suitable relatively high molecular weight polyamine compounds include those which contain aromatic amino groups and have molecular weights in the range described for relatively high molecular weight polyhydroxyl compounds. Polyamine compounds of the type may be obtained from the corresponding isocyanate prepolymers which are based on the above mentioned relatively high molecular weight polyhydroxyl compounds and excess amounts of aromatic diisocyanates by (preferably basic) hydrolysis. Examples of this process are set forth in DE-OS 2,948,419 and U.S. Pat. No. 4,774,263, which is herein incorporated by reference. This U.S. Patent also mentions other processes for the preparation of aromatic amino compounds having a relatively high molecular weight structure. Examples of suitable relatively high molecular weight polyamine compounds also include the amino polyethers obtained according to U.S. Pat. No. 2,888,439.

Examples of suitable relatively high molecular weight polyamine compounds containing aliphatic amino groups include those obtained by the reductive amination of polyoxyalkylene glycols with ammonia according to BE-P 634,741 and U.S. Pat. No. 3,654,370. Other relatively high molecular weight polyoxyalkylene polyamines may be prepared by the methods listed in "Jeffamine, Polyoxypropylene Amines" by Texas Chemical Co., 1978.

These modifying components may also be present in an isocyanate inert form, for example as polyether or polyesters in which the hydroxyl end groups are etherified, esterified with monocarboxylic acids, urethanized with monoisocyanates or as polyether amines carrying acetylated amino end groups. However, preferred isocyanate reactive components are incorporated in the polyurethane structure during the preparation or subsequent reaction of the urea group-containing polyisocyanates and therefore do not cause problems due to their migration or bleeding.

Preferred modifying compounds are polyethers or polyesters having molecular weight of 400 to about 10,000, preferably about 800 to 6,000. Polyethers having a molecular weight of about 1,000 to 4,500 and containing 0 to about 48% by weight, preferably about 5 to 25% by weight of ethylene oxide units are particularly preferred.

The lower limit of the amount of modifying agent which is used in accordance with the present invention is greater than 0, preferably greater than 2% by weight. The upper limit is less than 40, preferably less than 15 and most preferably less than 10% by weight. The percentages of the modifying agent are based on the total product, i.e., the combined weight of the starting polyisocyanate and the modifying agent.

The reaction of the modified starting polyisocyanate with water followed by isolation of the product is carried out by known processes such as those disclosed in U.S. Pat. No. 2,757,184 (herein incorporated by reference), DE 3,230,757 (U.S. Pat. No. 4,483,974, herein incorporated by reference), DE 3,438,527 (U.S. Pat. No. 4,680,367, herein incorporated by reference). These processes may generally be used without modification for the preparation of the modified polyisocyanates containing urea groups.

The modified polyisocyanates containing urea groups are similar to the unmodified products except for their lower isocyanate content, which is to be expected. The modified polyisocyanates obtained in accordance with the present invention have an isocyanate content of about 10 to 35% by weight, preferably about 15 to 30%, based on the weight of the modified polyisocyanate. Compared with the unmodified product, the modified polyisocyanates undergo coupling reactions more readily and have a higher reaction velocity with isocyanate reactive compounds.

The present invention will now be described in more detail in the following examples in which all parts are parts by weight unless otherwise indicated.

EXAMPLES

Example 1

Preparation of starting polyisocyanates modified with long chain compounds.

General Method of Procedure

The given quantity of modifying compound was added to the starting polyisocyanate under nitrogen at about 60° C. with stirring and the mixture was stirred at about 60° C. until there was not further reduction in the isocyanate content (generally 2 to 3 hours).

Table 1 provides a summary of the modified starting polyisocyanates prepared.

TABLE 1

| No. | Starting Polyisocyanate | Quantity | Modifying Component | | Quantity | % NCO titrated | % Calculated |
|---|---|---|---|---|---|---|---|
| 1p | Mixture of 80% 2,4- and 20% 2,6-toluylene diisocyanate | 728.7 | Polyether as in Example 1h | | 21.3 | 46.43 | 46.82 |
| 1q | 4,4'-diphenyl methane diisocyanate | 707.4 | Polyether as in Example 1h | | 42.6 | 31.32 | 31.48 |
| 1h | 2,4-toluylene diisocyanate | 728.7 | Polyether Polyol | Mixture of 33.3% by weight of polyether from Example 1g and 66.7% by weight of polyether | 21.3 | 46.54 | 46.82 |
| 1i | 2,4-toluylene diisocyanate | 707.4 | Polyether Polyol | $H_2O$/trimethylol propane 53.47 $\xleftarrow{100\%}$ PO. | 42.6 | 45.05 | 45.34 |
| 1j | 2,4-toluylene diisocyanate | 686.1 | Polyether Polyol | OH NO. 56, OH No. of mixture 50.1 | 63.9 | 43.22 | |
| 1k | 2,4-toluylene | 707.4 | Polyester of adipic acid and | | 42.6 | 45.10 | 45.32 |

TABLE 1-continued

| No. | Starting Polyisocyanate | Quantity | Modifying Component | | Quantity | % NCO titrated | % Calculated |
|---|---|---|---|---|---|---|---|
| 11 | 2,4-toluylene diisocyanate | 707.4 | ethylene glycol, MW 2000 Polyether ester[1)] OH. No. 89.0 | | 42.6 | 44.96 | 45.18 |
| 1m | 2,4-toluylene diisocyanate | 707.4 | Hydroxypolyacrylate[2)] Polyacrylate containing hydroxypropyl methacrylate units, 60% solution in xylene, OG. No. 45 | | 42.6 | 42.58 | 45.32 |
| 1n | 2,4-toluylene diisocyanate | | Polyether-polysiloxane block[3)] copolymer | | 42.6 | — | — |
| 1o | 2,4-toluylene diisocyanate | | Polyamine - Polypropylene glycol, MW 2000 containing aliphatic amino end groups | | 42.6 | 45.02 | 45.34 |
| 1a | 2,4-toluylene diisocyanate | 707.4 | Polyether Polyol | PG $\xleftarrow{87\%}$ PO* $\xleftarrow{13\%}$ EO, MW 2000, OH No. 56 | 42.6 | 44.01 | 45.32 |
| 1b | 2,4-toluylene diisocyanate | 707.4 | Polyether Polyol | PG $\xleftarrow{65\%}$ PO* $\xleftarrow{35\%}$ EO, MW 2000, OH No. 56 | 42.6 | 45.18 | 45.32 |
| 1c | 2,4-toluylene diisocyanate | 707.4 | Polyether Polyol | PG $\xleftarrow{85\%}$ PO* $\xleftarrow{15\%}$ EO, MW 4000, OH No. 28 | 42.6 | 44.32 | 45.44 |
| 1d | 2,4-toluylene diisocyanate | 707.4 | Polyether Polyol | TMP $\xleftarrow{82.5}$ PO $\xleftarrow{17.5\%}$ EO OH NO. 34 | 42.6 | 44.88 | |
| 1e | 2,4-toluylene diisocyanate | 707.4 | Polyether Polyol | as in Example 1d with 20% polymer filler of acrylonitrile/styrene 3:2, OH No. 28 | 42.6 | 45.19 | 45.44 |
| 1f | 2,4-toluylene diisocyanate | 707.4 | Polyether Polyol | as in Example 1d with 20% polyhydrazodiocarbonamide, OH No. 28 | 42.6 | 45.41 | 45.44 |
| | 2,4-toluylene diisocyanate | 707.4 | Polyether Polyol | Glycerol $\xleftarrow{5.3\%}$ PO* $\xleftarrow{4.6\%}$ EO $\xleftarrow{81.7\%}$ PO* $\xleftarrow{8.4\%}$ EO OH No. 35 | 42.6 | 45.31 | 45.41 |

PG = 1,2-propylene glycol
EO = ethylene oxide
PO = propylene oxide $\xleftarrow{}$ = alkoxylation reaction

* $\xleftarrow{}$ = second stage of alkoxylation

** $\xleftarrow{}$ = third alkoxylation stage

*** $\xleftarrow{}$ = fourth stage of alkoxylation

[1)]From 1 mole of polypropylene glycol, MW 1000, and 2 moles of caprolactam, OH No. 89.0
[2)]Desmophen A 160 of Bayer AG
[3)]Stabilizer OS 50, Goldschmidt, Essen

Example 2

Preparation of urea group-containing polyisocyanates modified with long chain compounds by the "water process" from the modified starting polyisocyanates prepared in Example 1.

General Method of Procedure

Aqueous phase:
3,500 ml of water
20 g of a solution of 28.9 g of triethanolamine, 15 g of glycine and 134.4 g of water and 12.5 g of dimethylbenzylamine
Organic phase: 750 g of the modified starting polyisocyanate from Example 1

The water (preferably demineralized water) was homogeneously mixed with the stabilizer solution and the catalyst in a glass beaker of suitable size at room temperature or with mild cooling (about 15° C.).

The starting polyisocyanate was then added and the diphasic mixture was vigorously mixed, either at the same time or subsequently, by means of an Ultraturrax Stirrer (Model T 45/N of IKA-Werk, Staufen of Breisgau with Generator 45 G 6), optionally with cooling (temperature of the mixture about 25° to 30° C.) at 10,000 rpm until a stable emulsion was obtained (generally about 3 minutes). The emulsion was then transferred into a reaction flask with round glass lid and continued to be stirred with a conventional paddle stirrer.

The quantity of $CO_2$ which evolved as the reaction gradually began was monitored with a gas meter. When evolution of $CO_2$ ceased, the reaction mixture was optionally neutralized (e.g. with 1N HCl) and the suspension obtained was suction filtered, washed with water and dried.

The yield was almost quantitative since virtually no unreacted starting isocyanate was left either in the filter cake or in the filtrate.

Table II provides a summary of the urea group-containing polyisocyanates prepared from the modified starting polyisocyanates of Example 1 by the water process.

TABLE II

| No. | Starting Polyiso-isocyanate | Isocyanate Content of the Product | Particle Shape |
|---|---|---|---|
| 2a | 1a | 21.46% by weight | Spheres 2 to 15 μm |
| 2b | 1b | 20.79% by weight | Spheres 2 to 12 μm |
| 2c | 1c | 21.50% by weight | Spheres 2 to 8 μm |
| 2d | 1d | 20.93% by weight | Spheres 2 to 8 μm |
| 2e | 1e | 21.62% by weight | Spheres 2 to 8 μm |
| 2f | 1f | 20.11% by weight | Spheres 1 to 10 μm |
| 2g | 1g | 21.06% by weight | Spheres 1 to 10 μm |
| 2h | 1h | 22.85% by weight | Spheres 2 to 10 μm |
| 2i | 1i | 21.86% by weight | Spheres 1 to 8 μm |
| 2j | 1j | 20.26% by weight | Spheres 1 to 6 μm |
| 2k | 1k | 22.40% by weight | Round particles 2 to 15 μm |
| 2l | 1l | 21.90% by weight | Round particles 3 to 15 μm |
| 2m | 1m | 22.67% by weight | Particles 1 to 10 μm |
| 2n | 1n | 21.57% by weight | Spheres 2 to 9 μm |
| 2o | 1o | 20.23% by weight | Spheres 1 to 8 μm |
| 2p | 1p | 20.08% by weight | Spheres 1 to 7 μm |

Example 3

Preparation of urea group-containing polyisocyanates modified with long chain compounds by the "solvent process."

Example 3A 300 g of the modified starting polyisocyanate prepared in Example 1i were dissolved in 1850 ml of diisopropyl ether, and 16.0 g of water were added to the solution at rom temperature with stirring. A total of 19.5 liters of $CO_2$ evolved after 1.5 hours stirring at room temperature and 2 hours stirring at 40° to 50° C. The precipitated product was suction filtered, washed with petroleum ether and dried in a vacuum drying cupboard at 50° C.

Yield: 228.2 g (82% of theoretical).

NCO content: 24.93 (theoretical 24.49).

A product prepared by this process from unmodified 2,4-toluylene diisocyanate had an isocyanate content of 25.7–26.1% by weight.

Example 3B 150 g of the starting polyisocyanate prepared in Example 1g were dissolved in 800 g of acetone. 55 g of water dissolved in 50 g of acetone were added dropwise with stirring within 5 minutes. Stirring was then continued for about 1 hour at room temperature and 4 hours at 40° to 60° C. A total of 6.5 liters of $CO_2$ evolved. The resulting suspension was diluted with 500 ml of acetone, suction filtered, washed with petroleum ether and dried in a vacuum drying cupboard at 50° C.

Yield: 111 g (78% of theoretical).

NCO content: 17.5% by weight (theoretical 16.0% by weight, still contained unreacted 4,4'-diphenylmethane diisocyanate).

Example 4

Preparation of a modified polyisocyanate containing urea groups from a mixture of an unmodified starting polyisocyanate and a modifying component by the "water process." The procedure was the same as in Example 2a but instead of the modified starting polyisocyanate, a freshly prepared mixture of the modifying component and the starting polyisocyanate was used.

NCO content: 20.93% by weight.

Particle form: spheres 2 to 8 μm.

Example 5

Preparation of a modified polyisocyanate containing urea groups by the "water process," using the modifying component in the aqueous phase.

Aqueous phase:
3,500 ml of water
42.6 g of the modifying component used in Example 1i
20 g of a solution of 28.9 g of triethanolamine, 15.0 g of glycine and 134.4 g of water and 12.5 g of dimethyl benzylamine Organic phase: 707.4 g of 2,4-toluylene diisocyanate.

The reaction was carried out by the general method of procedure set forth for Example 2.

NCO content: 21.76% by weight.

Particle form: spheres 4 to 10 μm.

Example 6

Comparison of the modified polyisocyanate containing urea groups prepared according to Example 2i with the corresponding unmodified polyisocyanate containing urea groups in a storage stable polyurethane reactive system.

The corresponding unmodified polyisocyanate was prepared by the general method of procedure of Example 2 using 750 g of unmodified 2,4-toluylene diisocyanate as the organic phase.

NCO content: 23.5% by weight.

| Composition of the reactive systems (in parts by weight) | | |
|---|---|---|
| | A According to The Invention | B Comparison |
| 26 Polyether amine[1] | 100 | 100 |
| T 403[2] | 0.25 | 0.23 |
| Polyisocyanate of Example 2i | 35.6 | |
| Unmodified comparison product | | 33.1 |
| Thickening temperature (see below) | 92° C. | 95° C. |

[1]Polyoxypropylene glycol polyether with aromatically bound amino end groups and an NH number of 82.9 prepared according to DOS 2,948,419 by the hydrolysis of a prepolymer obtained from 1 mole of polyoxypropylene glycol, MW 1000, and 2 moles of 2,4-toluylene diisocyanate.
[2]Jeffamine T 403 of Texaco Chemical Company, trifunctional polyoxyalkylene amine, MW approximately 400.

Preparation and Testing of the Reactive Systems

The polyether amine was vigorously mixed, first with T 403 and then with the urea group-containing polyisocyanate, using a powerful stirrer with a toothed rim disc, and the mixture was then degasified in a water jet vacuum. The "thickening temperature" of the mixture was then determined by the method described in DOS 3 230 757, page 49, and sample plate measuring 20×20×0-3 cm was then produced in a metal casting mold (curing of the liquid mixture for 1 hour at 150° C.).

Table III shows the mechanical properties of the sample plates produced.

TABLE III

| Mechanical values of the cured test plates. | | |
| --- | --- | --- |
|  | A | B |
| Tensile strength (MPa) | 29 | 27 |
| 100% modulus DIN 53 504 (MPa) | 28.9 | 27 |
| Elongation at break DIN 53 504 (%) | 200 | 100 |
| Tear propagation resistance DIN 53 515 (kN/m) | 82 | 45 |
| Shore hardness DIN 53 505 | A:99 D:66 | A:98 D:63 |
| Elasticity DIN 53 512 (%) | 35 | 37 |

The improvement in coupling reactions (polymer forming reactions between polyisocyanate and isocyanate reactive component) is clearly demonstrated by the substantially improved elongation at break and tear propagation resistance.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A modified urea group-containing polyisocyanate which is prepared by a process which comprises
    a) reacting a starting polyisocyanate which is free from urea groups with a long chain compound having a molecular weight of about 800 to 6,000 and
    b) subsequently reacting the modified polyisocyanate produced in a) with water to form urea groups in an inert reaction medium or in an aqueous mixture containing a dispersion stabilizer.

2. The modified urea group-containing polyisocyanate of claim 1 wherein said long chain compound is present in an amount of greater than 0 to less than 40% by weight, based on the weight of said polyisocyanate.

3. The modified urea group-containing polyisocyanate of claim 1 wherein said long chain compound is present in an amount of greater than 2 to less than 15% by weight, based on the weight of said polyisocyanate.

4. The modified urea group-containing polyisocyanate of claim 1 which has an isocyanate content of about 10 to 35% by weight.

5. The modified urea group-containing polyisocyanate of claim 2 which has an isocyanate content of about 10 to 35% by weight.

6. The modified urea group-containing polyisocyanate of claim 3 which has an isocyanate content of about 10 to 35% by weight.

7. A process for the preparation of a modified urea group-containing polyisocyanate which comprises
    a) reacting a starting polyisocyanate which is free from urea groups with a long chain compound having a molecular weight of about 800 to 6,000 and
    b) subsequently reacting the modified polyisocyanate produced in a) with water to form urea groups in an inert reaction medium or in an aqueous mixture containing a dispersion stabilizer.

8. The process of claim 7 wherein said long chain compound is present in an amount of greater than 0 to less than 40% by weight, based on the weight of said polyisocyanate.

9. The process of claim 7 wherein said long chain compound is present in an amount of greater than 2 to less than 15% by weight, based on the weight of said polyisocyanate.

10. The process of claim 7 wherein said modified urea group-containing polyisocyanate has an isocyanate content of about 10 to 35% by weight.

11. The process of claim 8 wherein said modified urea group-containing polyisocyanate has an isocyanate content of about 10 to 35% by weight.

12. The process of claim 9 wherein said modified urea group-containing polyisocyanate has an isocyanate content of about 10 to 35% by weight.

13. A polyurethane or polyurea reaction product of the modified urea group-containing polyisocyanate of claim 1 and a compound containing at least two isocyanate reactive groups.

* * * * *